United States Patent
Zhou et al.

(10) Patent No.: US 10,649,522 B2
(45) Date of Patent: May 12, 2020

(54) METHOD, APPARATUS AND SYSTEM FOR CONTROLLING SMART DEVICE BASED ON HEADPHONE

(71) Applicant: SHENZHEN GOODIX TECHNOLOGY CO., LTD., Shenzhen (CN)

(72) Inventors: Luming Zhou, Shenzhen (CN); Hexing Liu, Shenzhen (CN); Saiwen Lu, Shenzhen (CN); Ping Xu, Shenzhen (CN); Hongwu Li, Shenzhen (CN); Yicong Lin, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 102 days.

(21) Appl. No.: 15/641,326

(22) Filed: Jul. 5, 2017

(65) Prior Publication Data
US 2017/0300112 A1 Oct. 19, 2017

Related U.S. Application Data

(63) Continuation of application No. PCT/CN2016/090621, filed on Jul. 20, 2016.

(30) Foreign Application Priority Data

Feb. 3, 2016 (CN) .......................... 2016 1 0078042

(51) Int. Cl.
*H04R 1/10* (2006.01)
*G06F 3/01* (2006.01)
(Continued)

(52) U.S. Cl.
CPC ............. *G06F 3/012* (2013.01); *H04R 1/028* (2013.01); *H04R 1/10* (2013.01); *H04S 7/304* (2013.01)

(58) Field of Classification Search
CPC ..... G02B 27/017; G06F 3/0219; G06F 3/012; H04R 1/028; H04R 1/105; H04R 1/10
(Continued)

(56) References Cited

U.S. PATENT DOCUMENTS 4,788,983 A 12/1988 Brink et al.
2009/0009588 A1 1/2009 Shaffer et al.
(Continued)

FOREIGN PATENT DOCUMENTS

CN 102981626 A 3/2013
CN 103576843 A 2/2014
(Continued)

*Primary Examiner* — Abdul-Samad A Adediran (57) ABSTRACT

A method, apparatus and system for controlling a smart device based on a headphone are disclosed. The method includes: collecting, by the headphone, head motion feature data of a human body if a trigger condition of a collection task is satisfied; judging, according to the collected data, whether a target motion feature satisfying a predetermined motion feature is present in head motion feature of the human body; and if the target motion feature is present, acquiring information of an application currently running on the smart device, and generating an operation control instruction corresponding to the target motion feature according to the information of the currently running application and sending the operation control instruction to the smart device. According to the present application, control function may be enhanced for the smart device and control accuracy may be improved.

12 Claims, 8 Drawing Sheets

(51) Int. Cl.
*H04R 1/02* (2006.01)
*H04S 7/00* (2006.01)

(58) Field of Classification Search
USPC ................. 341/33; 345/8, 156; 381/74, 380; 455/569.1
See application file for complete search history.

(56) References Cited

U.S. PATENT DOCUMENTS

| | | | | |
|---|---|---|---|---|
| 2009/0097689 | A1* | 4/2009 | Prest | H04R 1/028 |
| | | | | 381/380 |
| 2009/0296951 | A1* | 12/2009 | De Haan | H04R 1/10 |
| | | | | 381/74 |
| 2010/0259471 | A1* | 10/2010 | Takano | G02B 27/017 |
| | | | | 345/156 |
| 2011/0285554 | A1* | 11/2011 | Aghaei | G06F 3/0219 |
| | | | | 341/33 |
| 2012/0002822 | A1 | 1/2012 | Peissig et al. | |
| 2012/0064951 | A1* | 3/2012 | Agevik | G06F 3/012 |
| | | | | 455/569.1 |
| 2014/0161300 | A1 | 6/2014 | Prest et al. | |
| 2014/0368412 | A1* | 12/2014 | Jacobsen | G02B 27/017 |
| | | | | 345/8 |
| 2015/0222977 | A1* | 8/2015 | Angel, Jr. | H04R 1/105 |
| | | | | 381/74 |

FOREIGN PATENT DOCUMENTS

| | | |
|---|---|---|
| CN | 103677232 A | 3/2014 |
| CN | 104536563 A | 4/2015 |
| EP | 2428869 A1 | 3/2012 |
| KR | 1020100118484 A | 11/2010 |

\* cited by examiner

METHOD, APPARATUS AND SYSTEM FOR CONTROLLING SMART DEVICE BASED ON HEADPHONE

CROSS-REFERENCE TO RELATED APPLICATIONS

The present application is a continuation of international application No. PCT/CN2016/090621 filed on Jul. 20, 2016, which claims the priority to Chinese Patent Application No. 201610078042.6, filed with the Chinese Patent Office on Feb. 3, 2016, both of which are incorporated herein by reference in its entirety.

TECHNICAL FIELD

The present application relates to the technical field of communications, and in particular, relates to a method, apparatus and system for controlling a smart device based on a headphone.

BACKGROUND

A headphone is also called a boomset or receiver and is formed by a pair of conversion units, which receives electric signals sent by a video player or receiver, and converts the electric signals into sound waves that may be heard by using a loudspeaker placed close to the ears. With the popularity of smart devices, a headphone is generally connected to a smart device by using a plug. Currently, headphones mating with the smart devices typically with the function of playing audios only, and thus are singular in functionality.

In the prior art, motion state data of a user is acquired by using a sensor configured in the headphone, and a mobile terminal switches audios played in the headphone according to the motion state data sent by the headphone, and is capable of switching between different audio plays according to the current motion state of the user. In this way, the need of facilitating user's more efficient motions is accommodated. However, in the above prior art, heart rate information or overall motion information detected by the sensor of the headphone is transmitted to the smart terminal only, and then processed on the mobile terminal. In this manner, various different head motion features may not be identified, and head motion features may not be effectively processed. This only provides simple heart rate and motion information, such as, whether the heart rate is high or low or whether the motion is strenuous or mild, and thus few operation instructions are generated. In addition, application of the instructions is limited to only implementation of such simple functions as voice switching.

SUMMARY

The present application is directed to providing a method, apparatus and system for controlling a smart device based on a headphone, wherein head motion feature data of a human body is collected using the headphone, and a target motion feature is identified therefrom, such that an operation control instruction of an application currently running on the smart device is controlled according to the target motion feature, so as to improve control precision of the smart device.

The present application provides a method for controlling a smart device based on a headphone. The method includes: collecting, by the headphone, head motion feature data of a human body if a trigger condition of a collection task is satisfied; judging, according to the collected data, whether a target motion feature satisfying a predetermined motion feature is present in head motion feature of the human body, the target motion feature comprises a motion feature with a predetermined motion speed and a predetermined motion direction; and if the target motion feature is present, acquiring information of an application currently running on the smart device, and generating an operation control instruction corresponding to the target motion feature according to the information of the currently running application and sending the operation control instruction to the smart device, the operation control instruction being configured to control the currently running application to make a response action corresponding to the operation control instruction.

Corresponding to the above method, the present application further provides an apparatus for controlling a smart device based on a headphone. The apparatus includes:

a collecting module, configured to collect head motion feature data of a human body if a trigger condition of a collection task is satisfied; a judging module, configured to judge, according to the collected data, whether a target motion feature satisfying a predetermined motion feature is present in head motion feature of the human body, the target motion feature comprises a motion feature with a predetermined motion speed and a predetermined motion direction; an acquiring module, configured to, if the judging module judges that the target motion feature satisfying the predetermined motion feature is present, acquire information of an application currently running on the smart device; and a processing module, configured to generate an operation control instruction corresponding to the target motion feature according to the information of the currently running application, and send the operation control instruction to the smart device, the operation control instruction being configured to control the currently running application to make a response action corresponding to the operation control instruction.

The present application further provides a system for controlling a smart device based on a headphone. The system includes:

a headphone and a smart device; wherein the headphone is configured to: collect head motion feature data of a human body if a trigger condition of a collection task is satisfied, the target motion feature comprises a motion feature with a predetermined motion speed and a predetermined motion direction; and if the target motion feature is present, acquire information of an application currently running on the smart device, and generate an operation control instruction corresponding to the target motion feature according to the information of the currently running application and sending the operation control instruction to the smart device, the operation control instruction being configured to control the currently running application to make a response action corresponding to the operation control instruction; and the smart device is configured to receive the operation control instruction sent by the headphone, and control, according to the operation control instruction, the currently running application to make a response action corresponding to the operation control instruction.

With the method, apparatus and system for controlling a smart device based on a headphone according to the embodiments of the present application, head motion feature data of a human body is collected using the headphone, a target motion feature is identified therefrom, and an operation control instruction corresponding to an application currently running on the smart device and the identified target motion feature is generated, so as to control the currently running application to make a response action corresponding to the operation control instruction. As compared with the prior art, more complicated head motions may be identified, control precision of the smart device may be improved, different operation control instructions generated for different applications may be distinguished, and control function may be enhanced for the smart device.

BRIEF DESCRIPTION OF THE DRAWINGS

To describe technical solutions according to the embodiments of the present application or in the prior art, drawings that are to be referred for description of the embodiments or the prior art are briefly described hereinafter. Apparently, the drawings described hereinafter merely illustrate some embodiments of the present application. Persons of ordinary skill in the art may also derive other drawings based on the drawings described herein without any creative effort.

DETAILED DESCRIPTION

To make the objectives, technical features, and advantages of the present application clearer and more understandable, the technical solutions according to the embodiments of the present application are further described in detail with reference to the accompany drawings. Apparently, the embodiments described herein are merely some exemplary ones, rather than all the embodiments of the present application. Based on the embodiments of the present application, all other embodiments derived by persons of ordinary skill in the art without any creative efforts shall fall within the protection scope of the present application.

Figure 1:
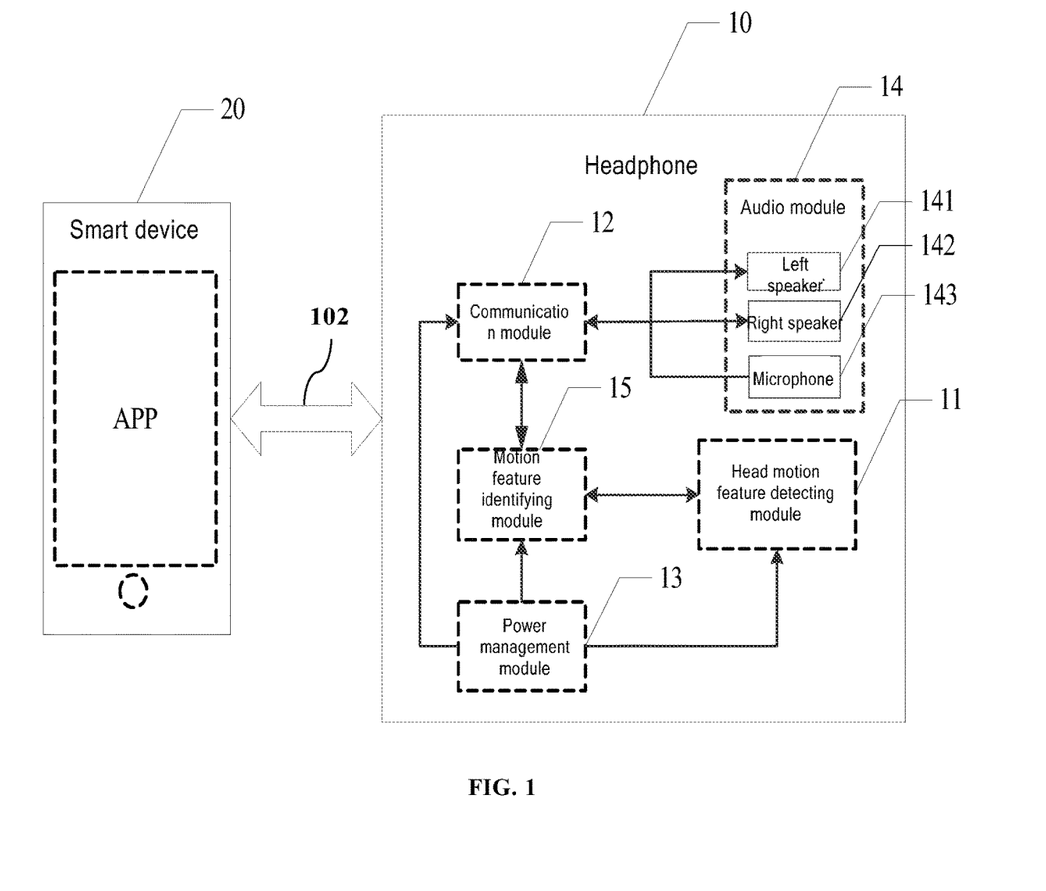
FIG. 1 is a schematic diagram of an application scenario of a method for controlling a smart device based on a headphone according to an embodiment of the present application.

FIG. 1 is a schematic diagram of an application scenario of a method for controlling a smart device based on a headphone according to an embodiment of the present application, wherein the application scenario involves a headphone 10 and a smart device 20 connected to the headphone 10 through a physical link 102.

The headphone 10 includes: a head motion feature detecting module 11, a communication module 12, a power management module 13 and an audio module 14.

The headphone 10 may further include: a motion feature identifying module 15.

Specifically, the head motion feature detecting module 11 is configured to implement a function of detecting a head motion feature of a human body of the headphone 10. After the system is powered on, the headphone 10 receives a detection instruction sent by the smart device 20 or automatically starts by default, and when the head motion feature detecting module 11 detects a head motion of the human body, head motion feature data, including complicated head motion feature and simple head motion feature, of the human body is collected. The complicated head motion feature includes, but not limited to, head motions of the human body such as quickly shake the head, quickly nod the head, quickly swing the head leftward and quickly swing the head rightward reaching a predetermined speed, and the complicated head motion feature may improve the precision of controlling the smart device. The simple head motion features include, but not limited to, head motions such as bend, left, horizontally move left and right and the like. With a combination with the complicated head motion feature of the human body, a function range of the smart device may be enlarged, and in addition a category range of instructions of the smart device may be enlarged. Furthermore, human body feature data such as heart rate, blood pressure, breathing rate and the like may also be collected. A head motion sensor, a heart rate sensor, a blood pressure sensor, a breathing sensor, a signal processor and the like may be arranged inside the head motion feature detecting module 11.

The communication module 12 is configured to communicate with the smart device 20. The communication module 12 receives in the uplink the head motion feature data of the human body collected by the head motion feature detecting module 11; or receives the head motion feature of the human body transmitted by the motion feature identifying module 15, and transmits the head motion feature to the smart device 20, such that the smart device 20 processes the data; or receives an operation control instruction formed in the motion feature identifying module 15, and transmits the instruction to the smart device 20 for execution. The communication module 12 receives in the downlink instruction data sent by the smart device 20, and transmits the data to the head motion feature detecting module 11. The communication module 12 may be practiced in a wireless or wired manner. In the wired manner, a headphone wire may be used as a carrier, and a communication protocol may be user-defined to implement function submodules such as demodulation and modulation. In the wireless manner, wireless communication manners including, but not limited to, Bluetooth, WiFi, ZigBee and the like may be used.

If the headphone 10 includes a motion feature identifying module 15, the motion feature identifying module 15 is configured to process the collected head motion feature data, form an operation control instruction corresponding to an application currently running on the smart device 20, and sends the operation control instruction to the communication module 12. The motion feature identifying module 15 is further configured to compress and code the head motion feature data of the human body collected by the head motion feature detecting module 11, and send the data to the communication module 12. The communication module 12 sends the data to the smart device 20, such that the smart device 20 further processes the head motion feature data of the human body.

The motion feature identifying module 15 is further configured to make a response to a headphone control instruction sent by the smart device 20, for example, a start instruction or a stop instruction; And is further configured to disable the head motion detecting module 11 according to an instruction from the smart device 20, such that the headphone 10 enters a low power-consumption mode.

The power management module 13 is configured to supply power for or management power for the headphone 10. Two functions are mainly implemented. One is to ensure normal power-on of the system, and prevent repeated restarts due to voltage variations during the course of power-up and startup of the system; and the other is to stabilize the power, and ensure that the headphone 10 constantly and normally operates. The power source supplying power for the system is practiced in two manners. One is a wired manner, wherein power is acquired from a designated port of the smart device 20 via, but not limited to, the MIC wire of the headphone 10 and the like, and the MIC wire is the microphone wire. The other is a wireless manner, wherein power is supplied to the headphone 10 using, but not limited to, a button cell, a lithium battery and the like. These two manners may be selected according to the actual needs of the headphone 10.

The audio module 14 is configured to play an audio and a voice call originated by the smart device 20, including a left speaker 141, a right speaker 142 and a microphone 143.

The smart device 20 includes, but not limited to, a smart phone, a smart watch, an audio player and the like. If the headphone 10 does not include the motion feature identifying module 15, the smart device 20 is configured to implement the function of processing the head motion feature data of the motion feature identifying module 15; and Is further configured to issue a control mode instruction for the headphone 10, including a start instruction and a stop instruction.

Further, the smart device 20 is further configured to receive the operation control instruction sent by the headphone 10 in real time, and make a response action in a corresponding application (APP).

The smart device 20 is further configured to monitor and process the data collected by the head motion feature detecting module 11 and sent by the headphone 10 in real time, and present the data to a user using a corresponding application.

Figure 2:
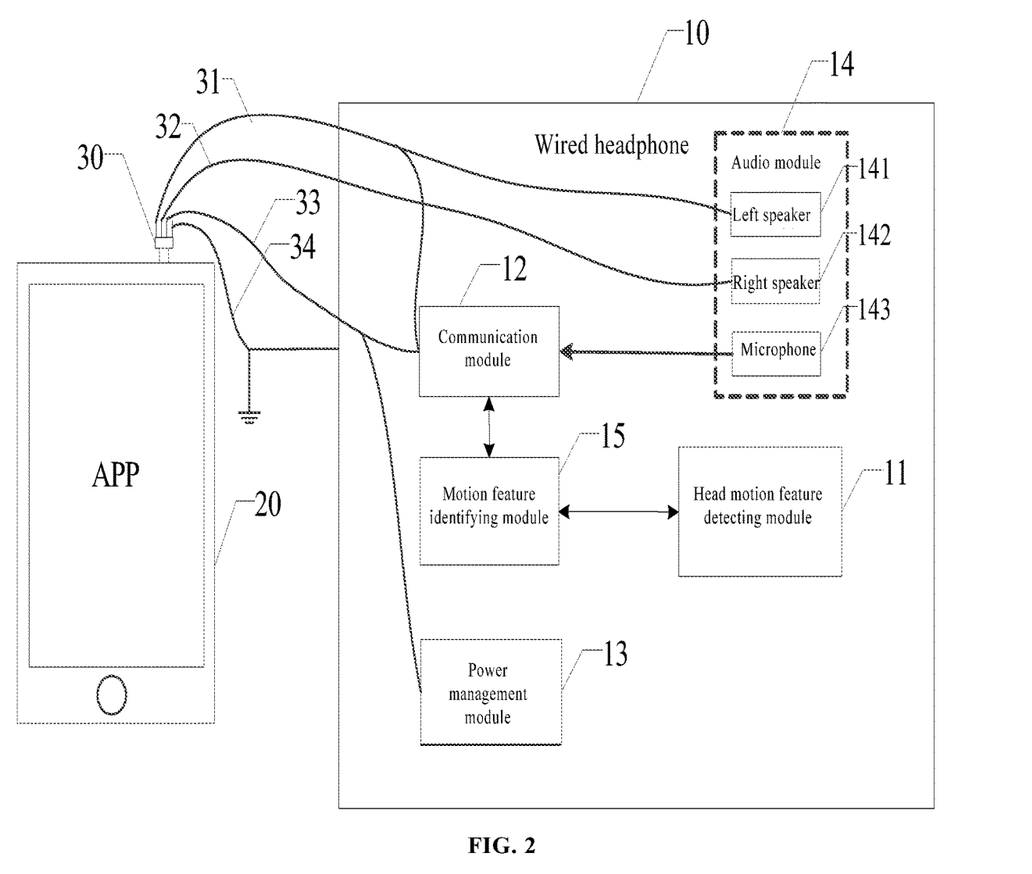
FIG. 2 is a schematic structural diagram of hardware of a wired headphone according to an embodiment of the present application.
Figure 3:
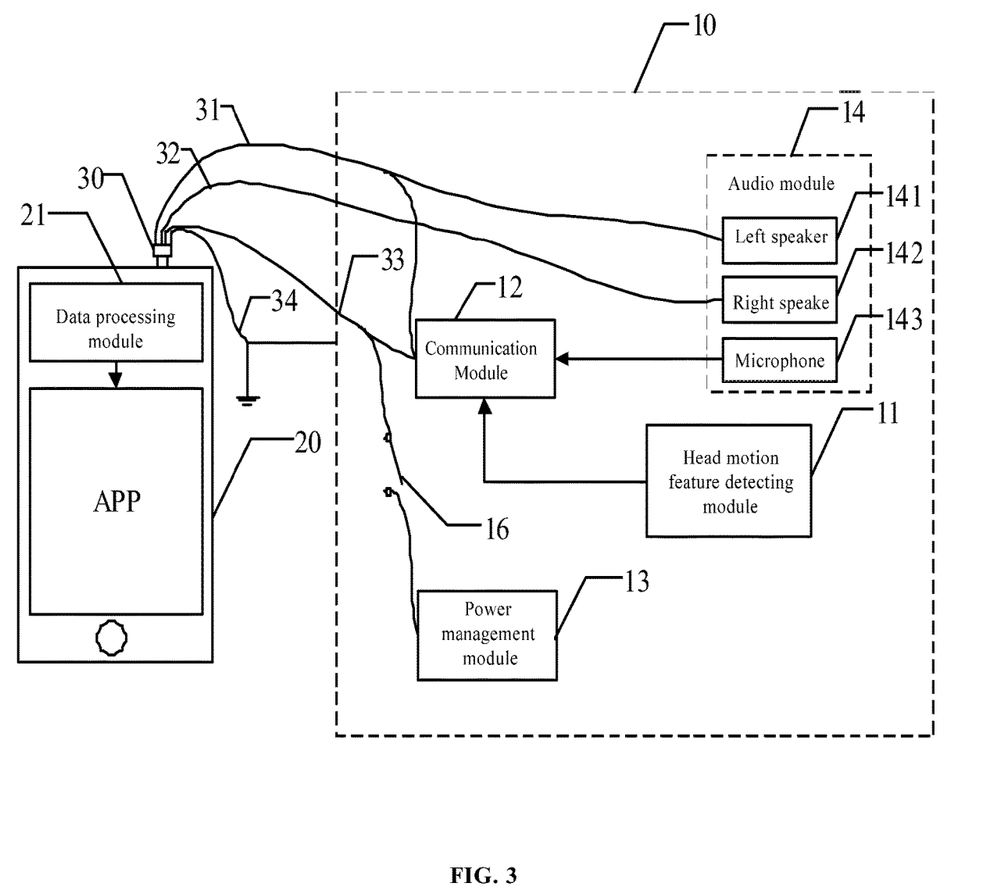
FIG. 3 is a schematic structural diagram of hardware of another wired headphone according to an embodiment of the present application.
Figure 4:
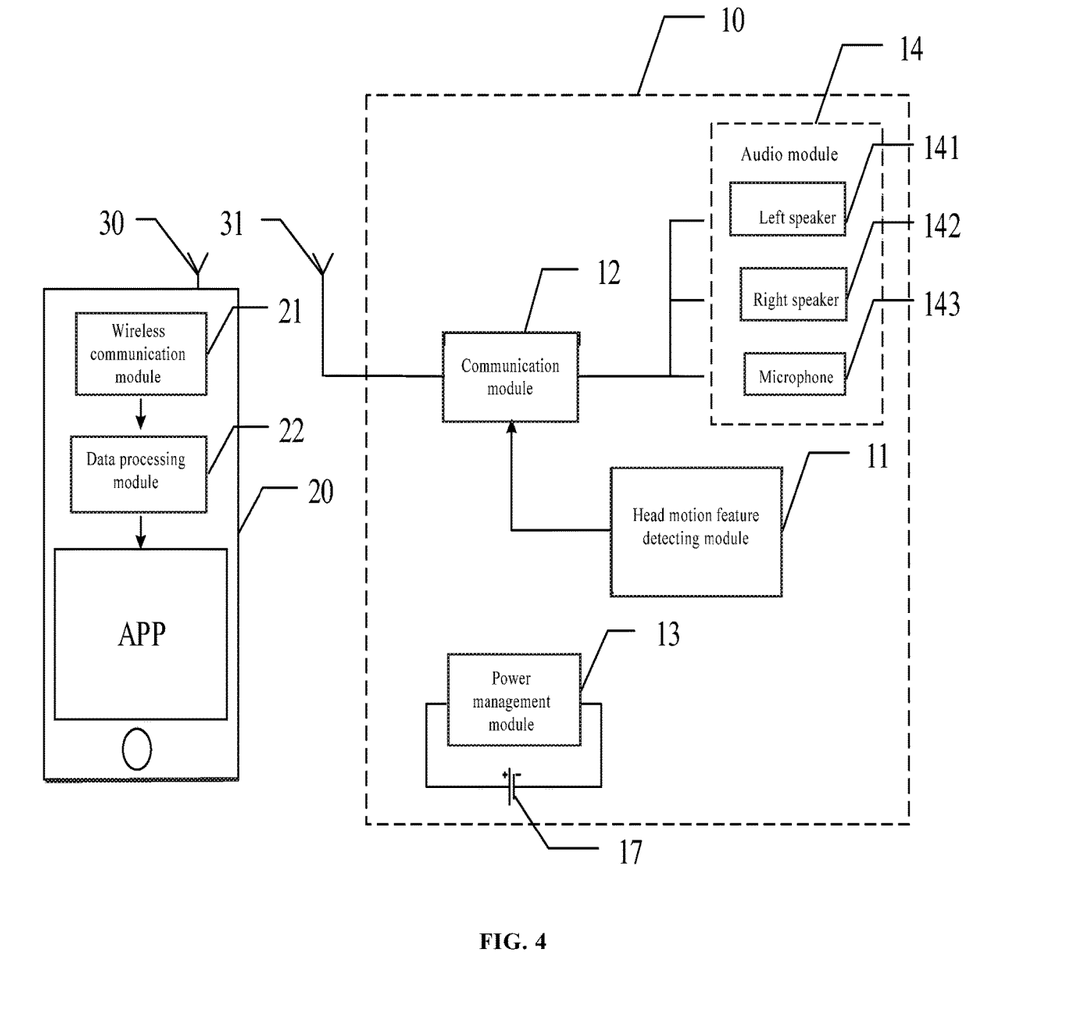
FIG. 4 is a schematic structural diagram of a wireless headphone according to an embodiment of the present application.

FIG. 2 is a schematic structural diagram of a system including a wired headphone and a smart device. FIG. 3 is a schematic structural diagram of another system including a wired headphone and a smart device. FIG. 4 is a schematic structural diagram of a system including a wireless headphone and a smart device. The functions of various modules in FIG. 2, FIG. 3 and FIG. 4 may be referenced to the descriptions of the functions of the corresponding modules in FIG. 1, which are not described herein any further.

In FIG. 2, the headphone 10 is a wired headphone, including a head motion feature detecting module 11, a communication module 12, a power management module 13, an audio module 14 and a motion feature identifying module 15.

A headphone plug 30 is an interface of the entire system and the smart device 20, which is similar to a common wire-controllable headphone, and has totally four ports, a left sound track interface 31, a right sound track interface 32, a microphone interface 33 and a ground wire interface 34.

The left sound track interface 31 and the right sound track interface 32 plays a role of downlink audio signals in the headphone 10, and the left sound track interface 31 or the right sound track interface 32 is reused as a downlink data interface of the headphone control system, and is capable of transmitting data collected by the headphone 10 or transmitting instructions issued by the headphone 10 and the smart device 20. The left sound track interface 31 and the right sound track interface 32 may also be reused as a downlink data interface, which are connected to the communication module 12.

The microphone interface 33 connected to the communication module 12 plays a role of uplink audio signals in the headphone 10, which may also be reused as a power source interface and an uplink data interface of the system. When the microphone interface 33 is used as the power interface, the power management module 13 is connected with the microphone interface, which, in collaboration with a physical key, implements turn-on and turn-off of the power source.

The ground wire interface 34 provides a reference ground for the entire system.

In FIG. 3, the headphone 10 is a wired headphone, including a head motion feature detecting module 11, a communication module 12, a power management module 13, an audio module 14 and a power management module control switch 16.

A data processing module 21 is additionally provided in the smart device 20, and is configured to process the data collected by the head motion feature detecting module 11 and transmitted by the communication module 12 to the smart device 20. That is, the smart device 20 processes the collected data, identifies the head motion feature, and generates an operation control instruction to instruct the application to make a response action, whereas the headphone 10 is only configured to collect data and transmit data.

In FIG. 4, A wireless communication module 21 is further provided in the smart device 20. The function of the wireless communication module 21 is the same as the communication module 12 at the headphone end, and is configured to implement wireless communication between the smart device 20 and the headphone 10. In addition, an antenna 30 is further provided in the smart device 20, wherein the antenna 30, together with an antenna 31 at the headphone end, forms a physical link for wireless communication.

A power source 17 is configured to supply power for the system, which includes, but not limited to, a lithium battery and a button cell.

Figure 5:
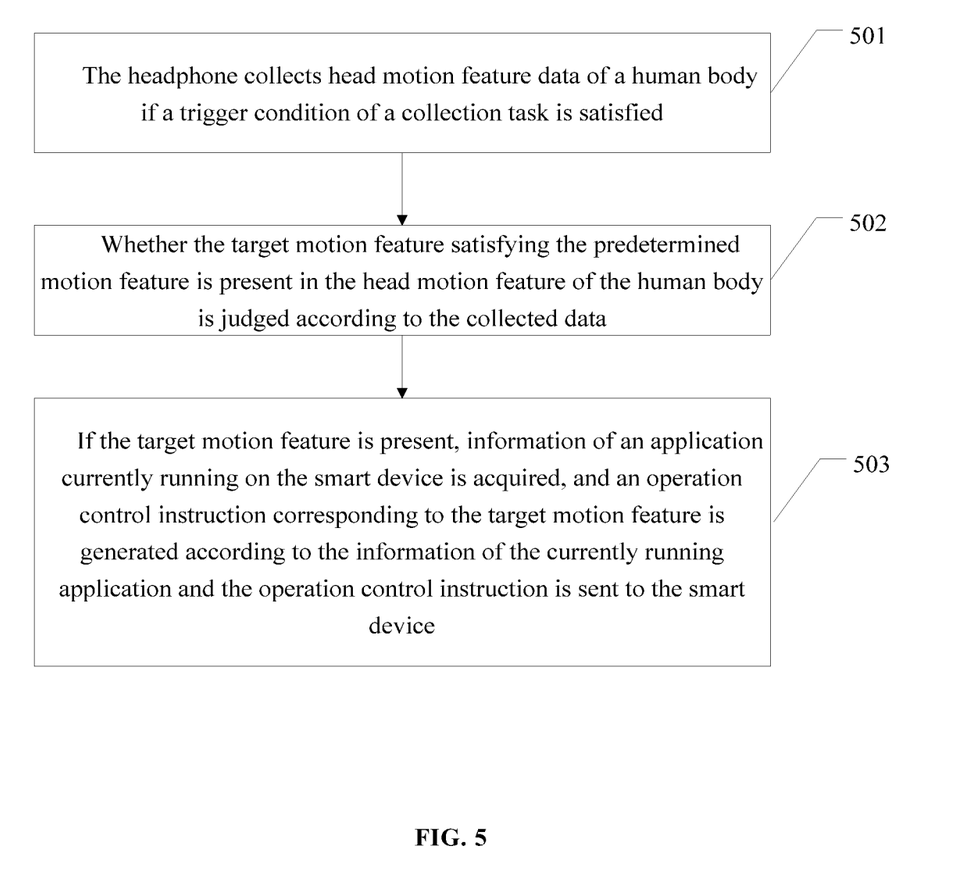
FIG. 5 is a schematic flowchart of a method for controlling a smart device based on a headphone according to a first embodiment of the present application.

Hereinafter methods for controlling a smart device based on a headphone according to embodiments of the present application are described in detail. Referring to FIG. 5, FIG. 5 is a schematic flowchart of a method for controlling a smart device based on a headphone according to a first embodiment of the present application. The method includes the following steps:

501: The headphone collects head motion feature data of a human body if a trigger condition of a collection task is satisfied.

The headphone may collect the head motion feature data of the human body in real time while normally playing audios and receiving MIC voice data.

A collection tasks is a task for collecting head motion feature data of a human body.

The collecting task may be triggered after the system is powered on and the headphone receives a data collection instruction sent by the smart device, or the headphone is triggered to automatically collect the head motion feature data of the human body after the system is powered on. The headphone is internally provided with a module that is capable of collecting the head motion feature data of the human body.

502: Whether the target motion feature satisfying the predetermined motion feature is present in the head motion feature of the human body is judged according to the collected data.

The target motion feature comprises a motion feature with a predetermined motion speed and a predetermined motion direction. The predetermined motion feature is the same as the target motion feature.

503: If the target motion feature is present, information of an application currently running on the smart device is acquired, and an operation control instruction corresponding to the target motion feature is generated according to the information of the currently running application and the operation control instruction is sent to the smart device.

The head motion feature of the human body may be acquired from the data collected by the headphone, and if the target motion feature satisfying the predetermined motion feature is present in the head motion feature of the human body, it indicates that a user desires to control the smart device to perform a corresponding operation using his or her head motion.

Further, information of an application currently running on the smart device is acquired, and the application may include a video and audio player configured to playing audio or video files and may further include a browser, wherein the browser includes a webpage browser configured to browse webpages and a reading browser configured to browse electronic books. In addition, the application may be a call application or may be a screen locking application configured to lock screen or unlock screen.

Further, an operation control instruction corresponding to the target motion feature is generated according to the information of the currently running application, wherein the operation control instruction is configured to control the currently running application to make a response action corresponding to the operation control instruction. Different applications correspond to different operation control instructions. The operation control instruction is sent to the smart device, such that the application running on the smart device makes a response action corresponding to the operation control instruction. In addition, the headphone also sends the collected data to the smart device.

If the target motion feature satisfying the predetermined motion feature is not present in the head motion feature of the human body, it indicates that the data collected by the headphone is invalid data, and may not be used to determine that the user desires to control the smart device using his or her head motion. Therefore, the headphone continuously collects the head motion feature data of the human body in real time.

According to this embodiment of the present application, head motion feature data of a human body is collected using the headphone, a target motion feature is identified therefrom, and an operation control instruction corresponding to an application currently running on the smart device and the identified target motion feature is generated, so as to control the application currently running on the smart device to make a response action corresponding to the operation control instruction. As compared with the prior art, more complicated head motions may be identified, control precision of the smart device may be improved, different operation control instructions generated for different applications may be distinguished, and control function may be enhanced for the smart device.

Figure 6:
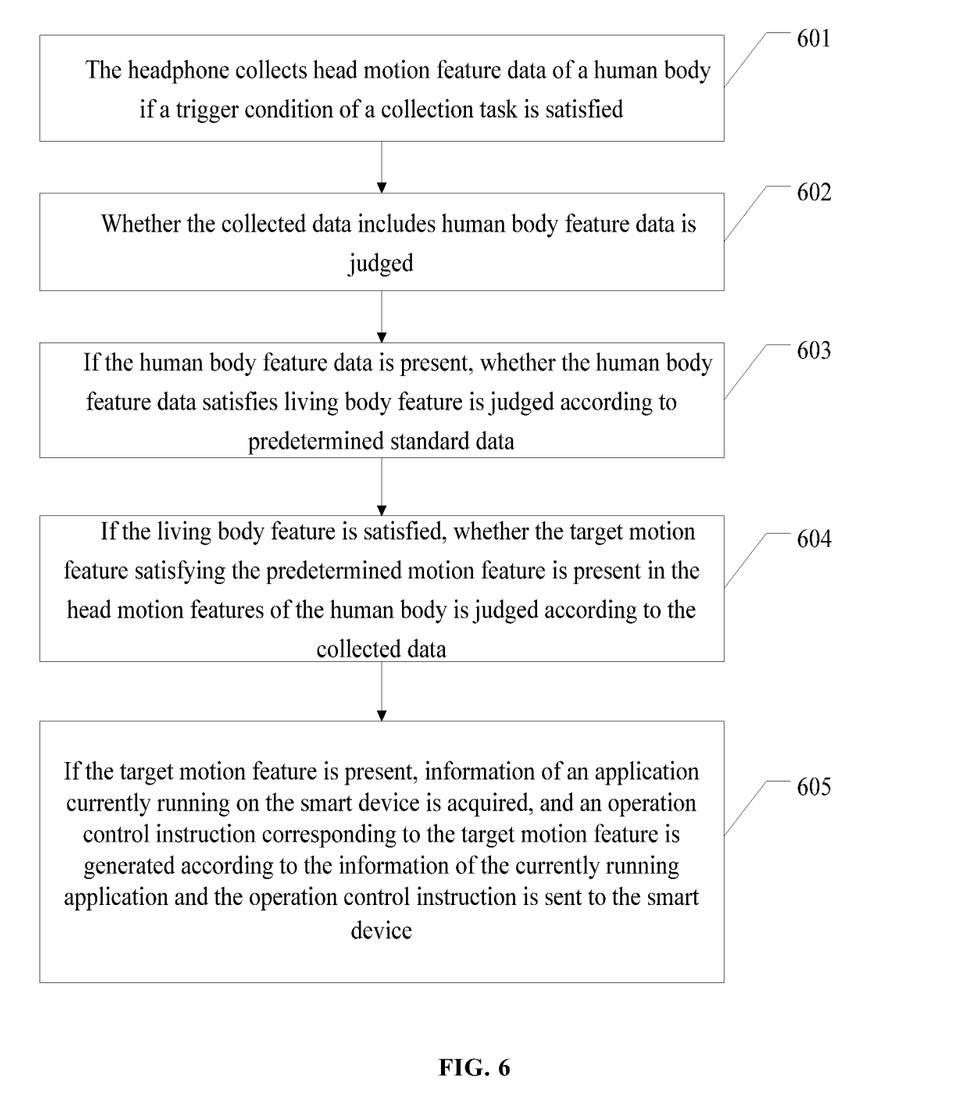
FIG. 6 is a schematic flowchart of a method for controlling a smart device based on a headphone according to a second embodiment of the present application.

Referring to FIG. 6, FIG. 6 is a schematic flowchart of a method for controlling a smart device based on a headphone according to a second embodiment of the present application. The method mainly includes the following steps:

601: The headphone collects head motion feature data of a human body if a trigger condition of a collection task is satisfied.

If the headphone is a wired headphone, the headphone may perform step 602 upon collecting the head motion feature data of the human body, and continuously process the collected data.

If the headphone is a wireless headphone, the headphone sends the collected head motion feature data of the human body to the smart device, and steps 602 to 605 are performed in the smart device. That is, subsequently processing the head motion feature data of the human body is carried out in the smart device.

602: Whether the collected data includes human body feature data is judged.

The human body feature data includes at least one of: heart rate data, blood pressure data, and breathing rate data.

Whether the data collected by the headphone includes the above heart rate data, blood pressure data, and breathing rate data is judged.

It should be noted that when the headphone is a wired headphone, the wired headphone performs the above judgment step. When the headphone is a wireless headphone, the headphone sends the collected data to the smart device, and the smart device performs the above judgment step.

603: If the human body feature data is present, whether the human body feature data satisfies living body feature is judged according to predetermined standard data.

The predetermined standard data, which is data predetermined in the headphone or the smart device, is a data range using which whether the human body has living body features is judged. This prevents incorrect data from being identified as the head motion feature of the human body, and thus improves identification efficiency and accuracy and further enhances control accuracy of the smart device.

If the human body feature data is not present, it indicates that the data collected by the headphone is not the head motion feature data of the human body, and it is not necessary to judge, according to the data collected by the headphone, whether the target motion feature satisfying the predetermined motion feature is present in the head motion feature of the human body. The headphone continuously collects the head motion feature data of the human body in real time.

604: If the living body feature is satisfied, whether the target motion feature satisfying the predetermined motion feature is present in the head motion feature of the human body is judged according to the collected data.

If the present human body feature data satisfies the living body feature, whether the target motion feature satisfying the predetermined motion feature is present in the head motion feature of the human body is further judged according to the head motion feature data collected by the headphone.

The target motion feature comprises a motion feature with a predetermined motion speed and a predetermined motion direction. Specifically, the target motion feature includes any one of the following features: quickly shake the head, quickly nod the head, quickly swing the head leftward and quickly swing the head rightward reaching a predetermined speed. That is, the target motion feature includes quickly shake the head, quickly nod the head, quickly swing the head leftward or quickly swing the head rightward reaching the predetermined speed.

As compared with the simple head motions in the prior art, according to this embodiment, such complicated head motions of the human body as quickly shake the head, quickly nod the head, quickly swing the head leftward and quickly swing the head rightward reaching a predetermined speed may also be detected, and further the number of times of the quickly shake the head, quickly nod the head, quickly swing the head leftward and quickly swing the head rightward may also be detected. For example, it may be detected that the user shakes his or her head three times.

In this embodiment, the user controls use of an application at a single end by using the quickly shake the head, quickly nod the head, quickly swing the head leftward and quickly swing the head rightward reaching the predetermined speed, or controls use of a plurality of applications by using different combinations of these motions, or controls use of the plurality of applications by further combining these motions with other simpler head motions. The head motions simpler than these motions include: head motions such as bend, left, horizontally move left, horizontally move left, tilt towards left shoulder, tilt towards right shoulder, and the like.

605: If the target motion feature is present, information of an application currently running on the smart device is acquired, and an operation control instruction corresponding to the target motion feature is generated according to the information of the currently running application and the operation control instruction is sent to the smart device.

Specifically, generating an operation control instruction corresponding to the target motion feature according to the information of the currently running application may involve the following four cases:

First, if the currently running application is a video and audio player:

A control operation to be performed for the video and audio player corresponding to the target motion feature is searched, wherein the control operation includes any one of the following: play, pause, next, previous, turn-up and turn-down. That is, a check is made to determine which control operation to be performed the video and audio player corresponds to the target motion feature in data stored in the headphone or in data stored in the smart device. An instruction for performing the control operation for the video and audio player corresponding to the target motion feature is generated.

For example, it is identified that a current head motion of the user is quickly nodding the head, and in the control operations to be performed for the video and audio player, quickly nodding the head signifies pause. In this case, a pause control instruction corresponding to the quickly nodding the head is generated and sent to the smart device, and the smart device thus instructs the video and audio player to temporarily stop playing an audio or video file being played.

Second, if the currently running application is a browser:

A control operation to be performed for the browser corresponding to the target motion feature is searched, wherein the control operation to be performed for the browser includes any one of the following: determine, exit, page-turn, leftward-shift, rightward-shift, upward-shift and downward-shift. The browser may be a webpage browser or may be a reading browser. An instruction for performing the control operation for the browser corresponding to the target motion feature is generated.

For example, it is identified that a current head motion of the user is quickly shaking the head, and in the control operations to be performed for the reading browser, quickly shaking the head signifies page-turn. In this case, a page-turn control instruction corresponding to the quickly shaking the head is generated and sent to the smart device, and the smart device thus instructs the reading browser to turn to a next page.

Third, if the currently running application is a call application:

A control operation to be performed for the call application corresponding to the target motion feature is searched, wherein the control operation to be performed for the call application includes any one of the following: answer, reject and hang-up. An instruction for performing the control operation for the call application corresponding to the target motion feature is generated.

For example, it is identified that a current head motion of the user is quickly swinging the head leftward, and in the control operations to be performed for the call application, quickly swinging the head leftward signifies answer. In this case, an answer control instruction corresponding to the quickly swinging the head leftward is generated and sent to the smart device, and the smart device thus instructs the call application to answer a current incoming call.

Fourth, if the currently running application is a screen locking application:

A control operation to be performed for the screen locking application corresponding to the target motion feature is searched, wherein the control operation to be performed for the screen locking application includes any one of the following: unlock and turn on the screen, and lock and turn off the screen. An instruction for performing the control operation for the screen locking application corresponding to the target motion feature is generated.

For example, it is identified that a current head motion of the user is quickly swinging the head rightward, and in the control operations to be performed for the screen locking application, quickly swinging the head rightward signifies unlock and turn on the screen. In this case, an unlock-and-turn-on-the-screen control instruction corresponding to the quickly swinging the head rightward is generated and sent to the smart device, and the smart device thus instructs the screen locking application to unlock the screen and increase the luminance of the screen.

It should be noted that, If the headphone is a wired headphone and if a judgment result indicates that the target motion feature satisfying the predetermined motion feature is present, the headphone sends the judgment result to the smart device, such that the smart device acquires the information of the currently running application of the smart device, and generates the operation control instruction corresponding to the target motion feature according to the information of the currently running application, and sends the operation control instruction to the currently running application, such that the currently running application makes a corresponding response action. In addition, the headphone also sends the collected data to the smart device.

Further, the data communication manner between the headphone and the smart device may vary with the scenario where whether the headphone is a wired headphone or a wireless headphone. Specifically, in a wired headphone, a communication protocol may be user-defined, and modulation and demodulation functions may be configured. According to the user-defined communication protocol, the collected data, the received operation control instruction and the audio signals may be modulated to a predetermined waveform, and then sent to the smart device. The predetermined waveform includes, but not limited to, a sine wave, a square wave, such that the collected data, the received operation control instruction and the audio signals are synchronously transmitted via the headphone wire. A wired headphone may exchange data with the smart device using communication manners, including but not limited to, Bluetooth, WiFi, ZigBee and the like.

Further, the manner of supplying power for the headphone may also vary with the scenario where whether the headphone is a wired headphone or a wireless headphone. If the headphone is a wired headphone, power is acquired from a designated port of the smart device via the MIC wire of the wired headphone, or power is supplied by using a battery, including a chargeable battery, a button cell or the like. When the headphone is a wireless headphone, power is supplied by using a battery, including a chargeable battery, such as a lithium battery and a button cell.

According to this embodiment of the present application, head motion feature data of a human body is collected using the headphone, complicated head motion feature of the human body, including quickly shake the head, quickly nod the head, quickly swing the head leftward and quickly swing the head rightward are identified therefrom, living body feature is identified using the collected data, which reduces risks of misjudgments, and thus an operation control instruction corresponding to an application currently running on the smart device and the identified head motion feature of the human body is generated, so as to control the application currently running on the smart device to make a response action corresponding to the operation control instruction. As compared with the prior art, more complicated head motions may be identified, control precision of the smart device may be improved, different operation control instructions generated for different applications may be distinguished, and control function may be enhanced for the smart device. In addition, using validity judgment of motions, misoperations are eliminated, and control accuracy is further enhanced.

Figure 7:
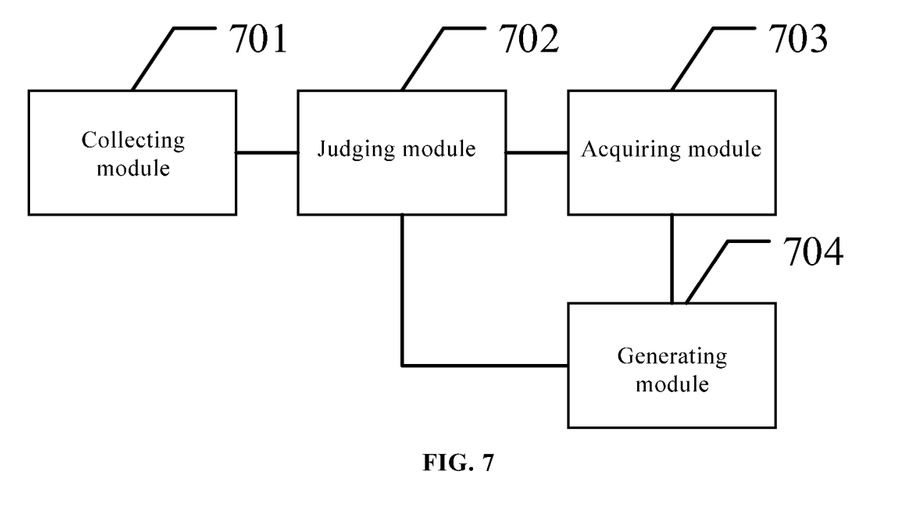
FIG. 7 is a schematic structural diagram of an apparatus for controlling a smart device based on a headphone according to a third embodiment of the present application.

Referring to FIG. 7, FIG. 7 is a schematic structural diagram of an apparatus for controlling a smart device based on a headphone according to a third embodiment of the present application. For ease of description, parts relevant to the embodiments of the present application are only illustrated. The apparatus for controlling a smart device based on a headphone as illustrated in FIG. 7 may be an enforcement object of the methods for controlling a smart device based on a headphone as illustrated in FIG. 5 and FIG. 6. The apparatus may be a headphone, or may be a function module of the headphone.

FIG. 7 illustrates an apparatus for controlling a smart device based on a headphone. The apparatus includes: a collecting module 701, a judging module 702, an acquiring module 703 and a generating module 704.

The above functional modules are described hereinafter in detail.

The collecting module 701 is configured to collect head motion feature data of a human body if a trigger condition of a collection task is satisfied.

The judging module 702 is configured to judge, according to the collected data, whether a target motion feature satisfying a predetermined motion feature is present in head motion feature of the human body, the target motion feature comprises a motion feature with a predetermined motion speed and a predetermined motion direction.

The acquiring module 703 is configured to, if the judging module 702 judges that the target motion feature satisfying the predetermined motion feature is present, acquire information of an application currently running on the smart device.

The generating module 704 is configured to generate an operation control instruction corresponding to the target motion feature according to the information of the currently running application, and send the operation control instruction to the smart device, the operation control instruction being configured to control the currently running application to make a response action corresponding to the operation control instruction.

For details that are not thoroughly described in this embodiment, reference may be made to the description in the foregoing embodiments as illustrated in FIGS. 5 to 6.

It should be noted that, in the embodiment of the apparatus for controlling a smart device based on a headphone as illustrated in FIG. 7, the apparatus is described by only using division of the above functional modules as an example. In practice, the functions may be assigned to different functional modules for implementation as required, for example, configuration requirements of corresponding hardware, or consideration of convenience of implementing software. To be specific, the internal structure of the apparatus is divided into different functional modules to implement all or part of the above-described functions. In addition, in practice, the corresponding functional modules in this embodiment may be practiced by corresponding hardware, or may be practiced by means of running corresponding software by the corresponding hardware. The embodiments provided in the present disclosure may observe the above description principles, which are not described hereinafter any further.

According to this embodiment of the present application, head motion feature data of a human body is collected using the headphone, a target motion feature is identified therefrom, and an operation control instruction corresponding to an application currently running on the smart device and the identified target motion feature is generated, so as to control the application currently running on the smart device to make a response action corresponding to the operation control instruction. As compared with the prior art, more complicated head motions may be identified, control precision of the smart device may be improved, different operation control instructions generated for different applications may be distinguished, and control function may be enhanced for the smart device.

Figure 8:
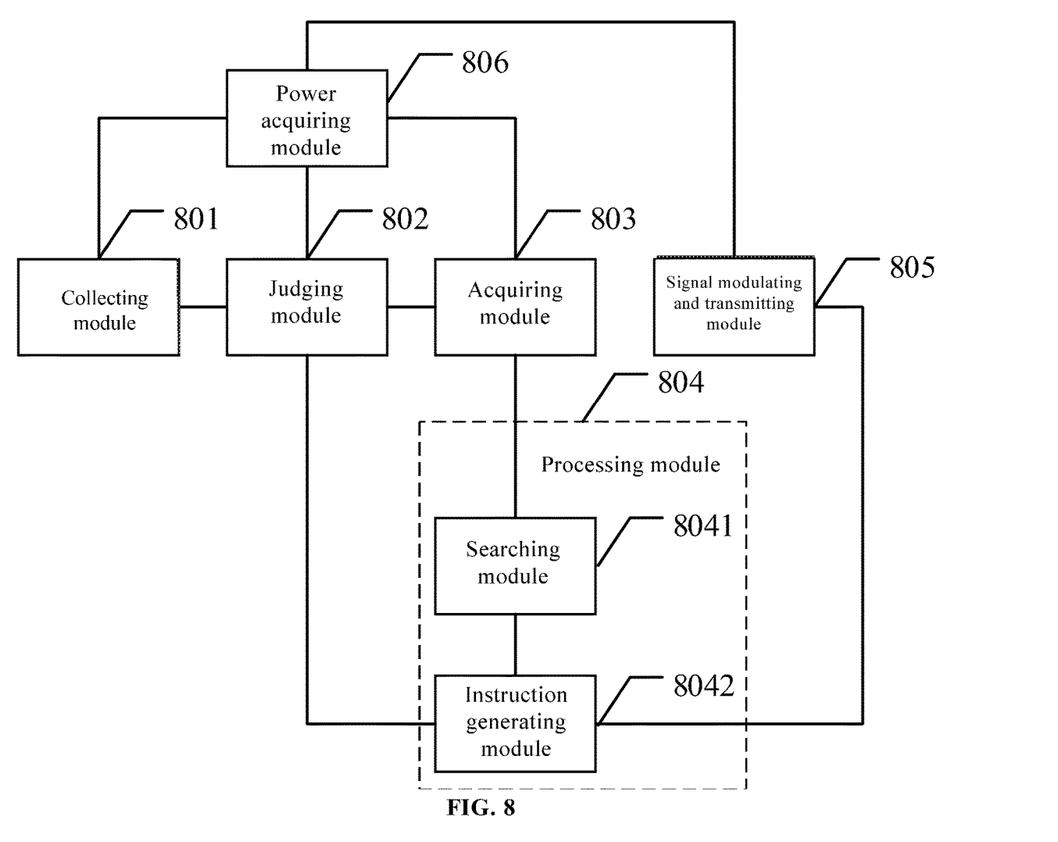
FIG. 8 is a schematic structural diagram of an apparatus for controlling a smart device based on a headphone according to a fourth embodiment of the present application.

Referring to FIG. 8, a schematic structural diagram of an apparatus for controlling a smart device based on a headphone according to a fourth embodiment of the present application is given. The apparatus mainly includes: a collecting module 801, a judging module 802, an acquiring module 803, a processing module 804, a searching module 8041, an instruction generating module 8042, a signal modulating and transmitting module 805 and a power acquiring module 806.

The above functional modules are described hereinafter in detail.

The collecting module 801 is configured to collect head motion feature data of a human body if a trigger condition of a collection task is satisfied.

The judging module 802 is configured to judge, according to the collected data, whether a target motion feature satisfying a predetermined motion feature is present in head motion feature of the human body, the target motion feature comprises a motion feature with a predetermined motion speed and a predetermined motion direction, and specifically including any one of the following features: quickly shake the head, quickly nod the head, quickly swing the head leftward and quickly swing the head rightward reaching a predetermined speed.

The acquiring module 803 is configured to, if the judging module 802 judges that the target motion feature satisfying the predetermined motion feature is present, acquire information of an application currently running on the smart device.

The processing module 804 is configured to generate an operation control instruction corresponding to the target motion feature according to the information of the currently running application, and send the operation control instruction to the smart device, the operation control instruction being configured to control the currently running application to make a response action corresponding to the operation control instruction.

The processing module 804 further includes:

a searching module 8041, configured to, if the currently running application is a video and audio player, search for a control operation to be performed for the video and audio player corresponding to the target motion feature, the control operation to be performed for the video and audio player including any one of: play, pause, next, previous, turn-up and turn-down.

The instruction generating module 8042 is configured to generate an instruction for performing the control operation for the video and audio player corresponding to the target motion feature.

The searching module 8041 is further configured to, if the currently running application is a browser, search for a control operation to be performed for the browser corresponding to the target motion feature, the control operation to be performed for the browser including any one of: determine, exit, page-turn, leftward-shift, rightward-shift, upward-shift and downward-shift.

The instruction generating module 8042 is configured to generate an instruction for performing the control operation for the browser corresponding to the target motion feature.

The searching module 8041 is further configured to, if the currently running application is a call application, search for a control operation to be performed for call application corresponding to the target motion feature, the control operation to be performed for the call application including any one of: answer, reject and hang-up.

The instruction generating module 8042 is configured to generate an instruction for performing the control operation for the call application corresponding to the target motion feature.

The searching module 8041 is further configured to, if the currently running application is a screen locking application, search for a control operation to be performed for screen locking application corresponding to the target motion feature, the control operation to be performed for screen locking application including any one of: unlock and turn on the screen, and lock and turn off the screen.

The instruction generating module 8042 is configured to generate an instruction for performing the control operation for the screen locking application corresponding to the target motion feature.

Further, the judging module 802 is further configured to: judge whether the collected data comprises human body feature data, the human body feature data comprises at least one of: heart rate data, blood pressure data, and breathing rate data; if the human body feature data is present, judge, according to predetermined standard data, whether the human body feature data satisfies living body feature; and if the living body feature is satisfied, judge, according to the collected data, whether the target motion feature satisfying the predetermined motion feature is present in the head motion feature of the human body.

The processing module 804 is further configured to, if the headphone is a wired headphone and if a judgment result indicates that the target motion feature satisfying the predetermined motion feature is present, send the judgment result to the smart device, such that the smart device acquires the information of the currently running application, and generates the operation control instruction corresponding to the target motion feature according to the information of the currently running application, and sends the operation control instruction to the currently running application.

If the headphone is a wired headphone, the apparatus further includes: a signal modulating and transmitting module 805.

a signal modulating and transmitting module 805 is configured to modulate the collected data, the operation control instruction and audio signals into a predetermined waveform according to a built-in user-defined communication protocol, and sending the same to the smart device via a headphone wire, such that the collected data, the operation control instruction and the audio signals are synchronously transmitted via the headphone wire; and a power acquiring module 806, configured to, if the headphone is a wired headphone, acquire power from a designated port of the smart device via a MIC wire of the wired headphone.

For details that are not thoroughly described in this embodiment, reference may be made to the description in the foregoing embodiments as illustrated in FIGS. 5 to 7.

According to this embodiment of the present application, head motion feature data of a human body is collected using the headphone, complicated head motion feature of the human body, including quickly shake the head, quickly nod the head, quickly swing the head leftward and quickly swing the head rightward reaching a predetermined speed are identified therefrom, living body feature is identified using the collected data, which reduces risks of misjudgments, and thus an operation control instruction corresponding to an application currently running on the smart device and the identified head motion feature of the human body is generated, so as to control the application currently running on the smart device to make a response action corresponding to the operation control instruction. As compared with the prior art, more complicated head motions may be identified, control precision of the smart device may be improved, different operation control instructions generated for different applications may be distinguished, and control function may be enhanced for the smart device.

Figure 9:
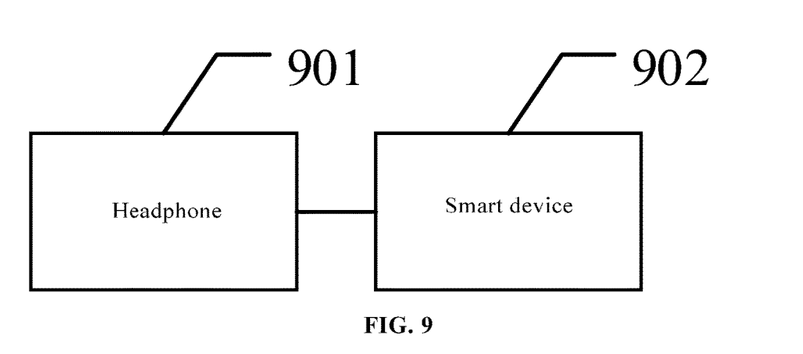
FIG. 9 is a schematic structural diagram of a system for controlling a smart device based on a headphone according to a fifth embodiment of the present application.

Referring to FIG. 9, a schematic structural diagram of a system for controlling a smart device based on a headphone according to a fifth embodiment of the present application is given. The system includes:

a headphone 901 and a smart device 902; wherein the headphone 901 is configured to: collect head motion feature data of a human body if a trigger condition of a collection task is satisfied, judge, according to the collected data, whether a target motion feature satisfying a predetermined motion feature is present in head motion feature of the human body, the target motion feature comprises a motion feature with a predetermined motion speed and a predetermined motion direction; and if the target motion feature is present, acquire information of an application currently running on the smart device, and generate an operation control instruction corresponding to the target motion feature according to the information of the currently running application and sending the operation control instruction to the smart device 902, the operation control instruction being configured to control the currently running application to make a response action corresponding to the operation control instruction; and the smart device 902 is configured to receive the operation control instruction sent by the headphone 901, and control, according to the operation control instruction, the currently running application to make a response action corresponding to the operation control instruction.

For details that are not thoroughly described in this embodiment, reference may be made to the description in the foregoing embodiments as illustrated in FIGS. 5 to 8.

According to this embodiment of the present application, head motion feature data of a human body is collected using the headphone, a target motion feature is identified therefrom, and an operation control instruction corresponding to an application currently running on the smart device and the identified target motion feature is generated, so as to control the application currently running on the smart device to make a response action corresponding to the operation control instruction. As compared with the prior art, more complicated head motions may be identified, control precision of the smart device may be improved, different operation control instructions generated for different applications may be distinguished, and control function may be enhanced for the smart device.

In the several embodiments provided in the present application, it should be understood that the disclosed system, apparatus and method may be practiced in other manners. The above described apparatus embodiments are merely illustrative. For example, the module division is merely logical function division and may be other divisions in actual practice. For example, multiple modules or components may be combined or integrated into another device, or some features can be ignored or not performed. In addition, the displayed or discussed mutual couplings or direct couplings or communication connections may be implemented through some interfaces. The indirect couplings or communication connections between the apparatuses or modules may be implemented in electronic, mechanical or other forms.

The units which are described as separate modules may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments.

In addition, functional modules in the embodiments of the present application may be integrated into one processing module, or each of the modules may exist along physically, or two or more modules may be integrated into one module. The above integrated module may be implemented by using hardware, and may also be implemented by using a software function module.

If the integrated module is implemented by using the software function module, and is sold or used as an independent product, the integrated module may also be stored in a computer readable storage medium. Based on such an understanding, the technical solutions of the present application essentially, or the part contributing to the related art, or all or a part of the technical solutions may be implemented in a form of a software product. The computer software product is stored in a storage medium and includes several instructions to cause a computer device (which may be a personal computer, a server, a network device, or the like) to perform all or some of steps of the methods described in the embodiments of the present application. The storage medium includes various media capable of storing program code, for example, a USB flash disk, a removable hard disk, a read-only memory (ROM), a random access memory (RAM), a magnetic disk, or an optical disc.

It should be noted that, with respect to the above described method embodiments, for brevity of description, the actions or steps are all described as a series of action combinations. However, a person skilled in the art shall understand that the embodiments of the present application are not subjected to limitations of the action sequences described above. Further, based on the embodiments of the present application, some steps may be performed in another or other sequences or may be simultaneously performed. In addition, a person skilled in the art should also know that the embodiments described in the description herein are all preferred embodiments, and all the involved actions and modules are not mandatory ones of the embodiments of the present application.

In the above embodiments, descriptions give different particular emphases to various embodiments, and the portion of some embodiment that is not described may be referenced to the relevant description in other embodiments.

Detailed above describes a method, apparatus and system for controlling a smart device based on a headphone. A person skilled in the art would derive various modifications to the specific embodiments and application scope thereof based on the inventive concept of the embodiments of the present application. In conclusion, the disclosure of this specification shall not be construed to limit the present application.

What is claimed is:

1. A method for controlling a smart device based on a headphone, the headphone connected to the smart device through a wireless link, the headphone comprising a collecting module, the method comprising:

collecting, by the collecting module in the headphone, head motion data referring to a head motion when a trigger condition of a collection task is satisfied;

judging, by the smart device and according to the collected head motion data, whether a target motion satisfying a predetermined motion is present in the collected head motion data, wherein the target motion feature comprises any one of the following features: quickly shaking a head, quickly nodding the head, quickly swinging the head leftward and quickly swinging the head rightward that reach a predetermined speed; and when the target motion is present, acquiring, by the smart device, information of an application currently running on the smart device to identify the application currently running on the smart device among different applications for which different operation control instructions are generated, generating an operation control instruction corresponding to the target motion according to the information of the currently running application, the operation control instruction being configured to control the currently running application to make a response action corresponding to the operation control instruction.

2. The method according to claim 1, wherein the generating an operation control instruction corresponding to the target motion according to the information of the currently running application comprises:

when the currently running application is a video and audio player, searching for a control operation to be performed for the video and audio player corresponding to the target motion, the control operation to be performed for the video and audio player comprises any one of: play, pause, next, previous, turn-up and turn-down; and generating a video and audio playing instruction for performing the control operation for the video and audio player corresponding to the target motion.

3. The method according to claim 1, wherein the generating an operation control instruction corresponding to the target motion according to the information of the currently running application comprises:

when the currently running application is a browser, searching for a control operation to be performed for the browser corresponding to the target motion, the control operation to be performed for the browser comprises any one of: determine, exit, page-turn, leftward-shift, rightward-shift, upward-shift and downward-shift; and generating an instruction for performing the control operation for the browser corresponding to the target motion.

4. The method according to claim 1, wherein the generating an operation control instruction corresponding to the target motion according to the information of the currently running application comprises:

when the currently running application is a call application, searching for a control operation to be performed for the call application corresponding to the target motion, the control operation to be performed for the call application comprises any one of: answer, reject and hang-up; and generating an instruction for performing the control operation for the call application corresponding to the target motion.

5. The method according to claim 1, wherein the generating an operation control instruction corresponding to the target motion according to the information of the currently running application comprises:

when the currently running application is a screen locking application, searching for a control operation to be performed for screen locking application corresponding to the target motion, the control operation to be performed for screen locking application comprises any one of: unlock and turn on the screen, and lock and turn off the screen; and generating an instruction for performing the control operation for the screen locking application corresponding to the target motion.

6. The method according to claim 1, wherein prior to the judging, by the smart device and according to the collected head motion data, whether the target motion satisfying the predetermined motion is present in the collected head motion data, the method further comprises:

judging whether the collected head motion data comprises human body data, wherein the human body data comprises at least one of: heart rate data, blood pressure data, and breathing rate data;

when the human body data is present, judging, according to predetermined standard data, whether the human body data satisfies a human body characteristic; and when the human body characteristic is satisfied, judging, according to the collected head motion data, whether the target motion satisfying the predetermined motion is present in the collected head motion data.

7. A system comprising a headphone and a smart device, the headphone connected wirelessly to the smart device, the headphone comprising: a collecting module configured to collect head motion data referring to a head motion when a trigger condition of a collection task is satisfied; the smart phone comprising: a judging module, configured to judge, according to the collected head motion data, whether a target motion satisfying a predetermined motion is present in the collected head motion data, wherein the target motion comprises shaking a head, nodding the head, swinging the head leftward and swinging the head rightward; an acquiring module, configured to, when the judging module judges that the target motion satisfying the predetermined motion is present, acquire information of an application currently running on the smart device to identify the application currently running on the smart device among different applications for which different operation control instructions are generated; and a processing module, configured to generate an operation control instruction corresponding to the target motion according to the information of the currently running application, and send the operation control instruction to the smart device, the operation control instruction being configured to control the currently running application to make a response action corresponding to the operation control instruction.

8. The system according to claim 7, wherein the processing module comprises:

a searching module, configured to, when the currently running application is a video and audio player, search for a control operation to be performed for the video and audio player corresponding to the target motion, the control operation to be performed for the video and audio player comprises any one of: play, pause, next, previous, turn-up and turn-down; and an instruction generating module, configured to generate a video and audio playing instruction for performing the control operation for the video and audio player corresponding to the target motion.

9. The system according to claim 7, wherein the processing module comprises:

a searching module, configured to, when the currently running application is a browser, search for a control operation to be performed for the browser corresponding to the target motion, the control operation to be performed for the browser comprises any one of: determine, exit, page-turn, leftward-shift, rightward-shift, upward-shift and downward-shift; and the instruction generating module is further configured to generate a browsing instruction for performing the control operation for the browser corresponding to the target motion.

10. The system according to claim 7, wherein the processing module comprises:

a searching module, configured to, when the currently running application is a call application, search for a control operation to be performed for the call application corresponding to the target motion, the control operation to be performed for the call application comprises any one of: answer, reject and hang-up; and the instruction generating module is further configured to generate a calling instruction for performing the control operation for the call application corresponding to the target motion.

11. The system according to claim 7, wherein the processing module comprises:

a searching module, configured to, when the currently running application is a screen locking application, search for a control operation to be performed for screen locking application corresponding to the target motion, the control operation to be performed for screen locking application comprises any one of: unlock and turn on the screen, and lock and turn off the screen; and the instruction generating module is further configured to generate a screen locking instruction for performing the control operation for the screen locking application corresponding to the target motion.

12. The system according to claim 7, wherein the judging module is further configured to:

judge whether the collected head motion data comprises human body data, wherein the human body data comprises at least one of: heart rate data, blood pressure data, and breathing rate data;

when the human body data is present, judge, according to predetermined standard data, whether the human body data satisfies a human body characteristic; and when the human body characteristic is satisfied, judge, according to the collected head motion data, whether the target motion satisfying the predetermined motion is present in the collected head motion data.

\* \* \* \* \*